April 19, 1960  R. V. KLINT ET AL  2,933,286
DAMPING TURBINE BUCKETS
Filed Sept. 15, 1954
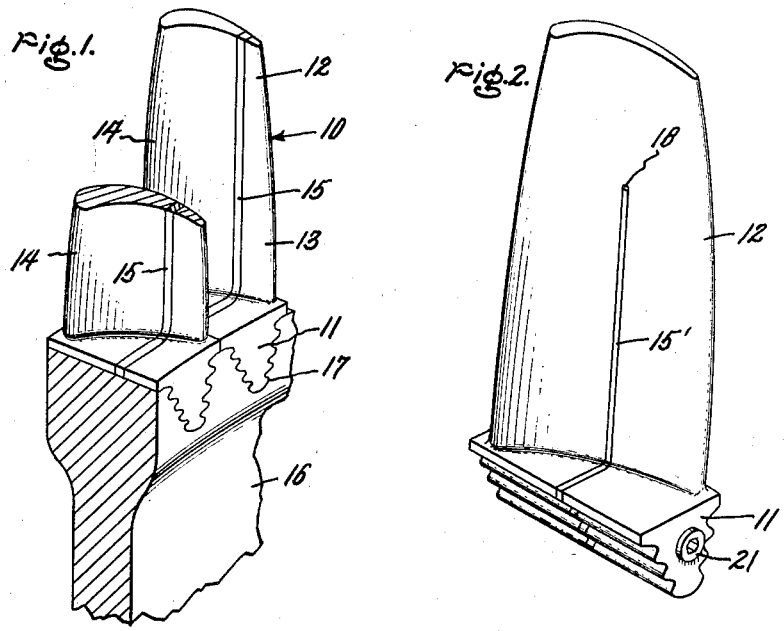
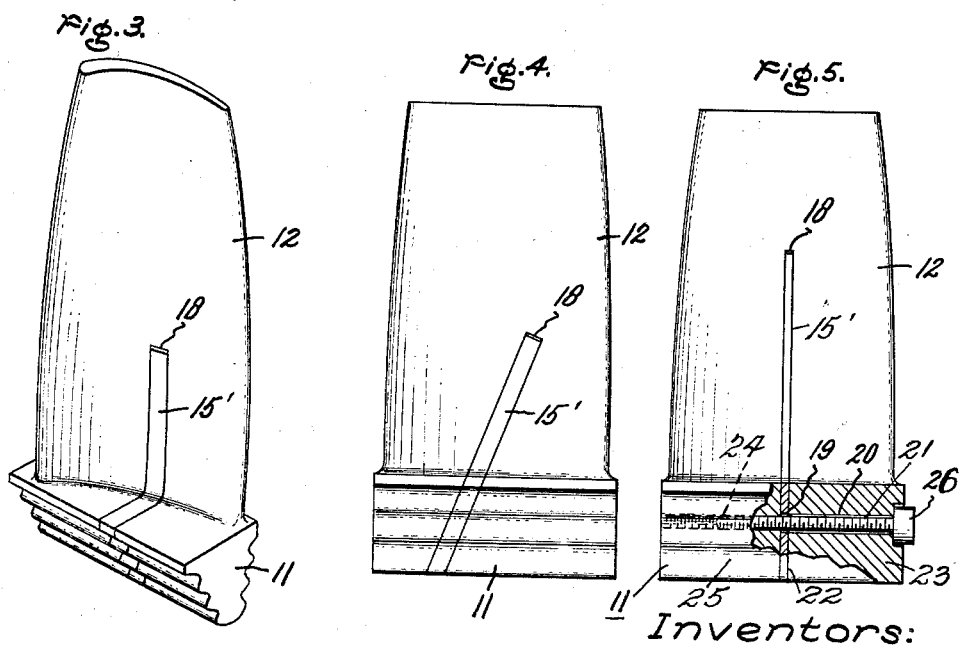
Inventors:
Robert V. Klint,
Anthony J. Nerad,
by Paul A. Frank
Their Attorney.

United States Patent Office 2,933,286
Patented Apr. 19, 1960

2,933,286

DAMPING TURBINE BUCKETS

Robert V. Klint, Vishers Ferry, and Anthony J. Nerad, Alplaus, N.Y., assignors to General Electric Company, a corporation of New York Application September 15, 1954, Serial No. 456,166

1 Claim. (Cl. 253—77)

This invention relates to fluid turbines and specifically to the vibration damping of buckets which are used in such turbines.

One of the serious problems presented in steam and gas turbine operation is the tendency of turbine buckets to fracture when they are subjected to a vibrational stress at or near resonant frequency. During acceleration or deceleration of steam and gas turbines, the buckets are momentarily subjected to vibrational stresses at their fundamental resonant frequency and in many cases to vibrational stresses at secondary or even higher resonant frequencies. When a bucket is subjected to a vibrational stress at or near its resonant frequency, its amplitude of vibration can readily build up to a point where fatigue fractures occur. Such fractures have occurred in the very tough and heat-stable metals or alloys from which turbine blades are fabricated.

The buckets which are most prone to fracture are those which are rigidly positioned in the turbine rotor. In most cases, the presence of a slight fracture which is caused by vibration results in a damping effect to safeguard the blade or bucket from further vibrational deterioration. However, the protection which is afforded by the damping effect of the fracture does not prevent further slow progress of the fracture, and it is not unusual for a portion of a turbine bucket to be broken off entirely. The desirability of damping turbine buckets to resist the fracturing effect of a vibrational stress at or near the resonant frequency of vibration of the bucket is obvious.

Accordingly, it is an object of our invention to provide a new and improved turbine bucket.

It is another object of the invention to provide a turbine bucket which will resist fracture when a vibrational stimulus is applied thereto.

It is a further object of the invention to provide a tubine bucket which utilizes frictional forces to achieve damping.

In carrying out our invention in one form, a metal member is positioned between a two-piece turbine bucket to provide a damping effect.

These and various other objects, features and advantages of the invention will be better understood from the following description taken in connection with the accompanying drawing in which:

Fig. 1 is a perspective view of an embodiment of our invention which is applied to a turbine bucket;

Fig. 2 is a perspective view of a second embodiment of our invention;

Fig. 3 is a perspective view of another embodiment of our invention;

Fig. 4 is a front elevational view of a modified turbine bucket; and

Fig. 5 is a partial sectional view of the turbine bucket which is shown in Fig. 2.

In Fig. 1 of the drawing, a turbine bucket which is shown generally at 10 comprises a base portion 11 with a blade 12 thereon. Bucket 10 is provided in two sections 13 and 14 between which a member or strip 15 is positioned. The member 15 is preferably of metal and of a rectangular cross section whose edge surfaces conform to the blade side surfaces and whose side surfaces are parallel not only to substantially fill the slot opening from side to side but also in order to have large surfaces to engage the adjacent surfaces defined by the walls of the slot. A slight clearance is provided between member 15 and sections 13 and 14 to provide frictional forces, i.e., rubbing between the member 15 and sections 13 and 14 during the operation of bucket 10 on a rotor. The member 15 may be said to abut the side walls of sections 13 and 14 or slot 18. Such frictional forces are controlled through a selection of fits between sections 13 and 14 and member 15, use of alloys in member 15 with different temperature expansion coefficients, or use of compression retainers. Various coatings, lubricants or anti-lubricants may also be applied to the edges of member 15 or sections 13 and 14 to provide friction which is neither excessive nor inadequate to achieve damping effects. The bending characteristic of member 15 is dissimilar enough from sections 13 and 14 to cause relative motion to occur therebetween. Buckets 10 are positioned on the periphery of a rotor 16 by means of dovetail base portions 11 which fit in mountings 17 thereon. Similar control is obtained in Figs. 2 through 5 by the rubbing action between member 15' and the adjacent sections of the blades.

In Fig. 2, a modified turbine bucket is shown which comprises a base portion 11 with a blade 12 thereon. As is best shown in Fig. 5, the turbine bucket in Fig. 2 is provided with a kerf-like opening or slot 18 which extends from the bottom of base portion 11 through a section of blade 12 less than the length thereof. Member 15', which is positioned in opening 18, is provided with an aperture 19 adjacent its base 22. An aperture 20 is located in base portion 11 to provide an opening in which a retaining member, such as, for example, a bolt 21 is inserted to secure member 15' in position. From an inspection of Fig. 5 it may be seen that bolt 21 is slidable through opening 20 in part 23 of base portion 11 on one side of member 15', passes through member 15' and threadedly engages the threaded portion 24 of opening 20 in part 25 of base portion 11. It is understood, therefore, that rotation or tightening of the bolt 21 with the head 26 thereof engaging part 23 increases the forces imposed on member 15'. Thus, bolt 21 becomes an adjustable securing or retaining member such that vibration damping or rubbing friction may be varied within a limited range, and furthermore, that such adjustable means permits manufacturing variances or tolerances in slot 18 and member 15'.

In Fig. 3, member 15 is provided in the kerf-like or slot opening 18 which extends from the bottom of base 11 through a portion of blade 12. If it is desired, turbine bucket 10 with member 15 therein may be assembled on rotor mounting 17 without retaining member 21. Such a configuration is also illustrated in Figs. 1 and 4.

In Fig. 4, slot 18 is cut through base portion 11 and blade 12 at an angle to the longitudinal axis of blade 12. The inclination of slot 18 determines the frictional force between member 15 and the walls of slot 18.

In the operation of a rotor with buckets thereon which are shown in Figs. 1–4, member 15 rubs against adjacent surfaces of base and blade portions 11 and 12 to provide frictional forces. Such rubbing friction damps the vibrations of the buckets. Thus, the amplitude of vibration does not increase to produce fatigue failure in the buckets.

Turbine buckets, which were composed of a very tough, fatigue-resistant alloy with a fatigue strength of over 60,000 p.s.i. at 1200° F., failed in fatigue in less than one minute under controlled turbine conditions in which only material damping was primarily present. Under similar conditions, turbine buckets which were made in accordance with this invention were vibrated for a period of days at resonance without fatigue failure.

As will become apparent to those skilled in the art, the objects of our invention are attained by the use of a metal member which is positioned between adjacent blade and base portions of a turbine bucket to damp the vibrations thereof.

While other modifications of this invention and variations of apparatus which may be employed within the scope of the invention have not been described, the invention is intended to include all such as may be embraced within the following claim.

What we claim as new and desire to secure by Letters Patent of the United States is:

A turbine bucket, comprising a blade, a base portion on said blade, said blade and said base portion provided with a kerf opening extending from the bottom of said base portion through a section of said blade less than the length of said blade, a metal member positioned in and substantially filling said kerf opening to abut each side wall of said kerf opening, said metal member being of a metal having different bending characteristics from the material of said blade, a lubricant coating on said member to permit relative motion between the contacting surfaces of said member and said blade and base portion, and adjustable retaining means for said member, said adjustable retaining means including said base portion having a first opening in one side of said metal member and a second threaded opening on the other side of said member, and a threaded retainer slidable through the said first opening and having means engaging the base portion on the said one side of said metal member, and threadedly engaging the threaded second opening in said base portion on the said other side of said member to vary the force imposed between said member and the said side walls of said kerf opening.

References Cited in the file of this patent

UNITED STATES PATENTS

| | | |
|---|---|---|
| 1,020,750 | Flanders | Mar. 19, 1912 |
| 1,255,650 | Samuelson | Feb. 5, 1918 |
| 1,457,404 | Snyder | June 5, 1923 |
| 1,585,713 | Herr et al. | May 25, 1926 |
| 1,718,030 | Cares | June 18, 1929 |
| 1,833,754 | Paget | Nov. 24, 1931 |
| 2,144,428 | Martin | Jan. 17, 1939 |
| 2,349,187 | Meyer | May 16, 1944 |
| 2,394,124 | Warren | Feb. 5, 1946 |
| 2,405,283 | Birmann | Aug. 6, 1946 |
| 2,636,399 | O'Connor | Apr. 28, 1953 |
| 2,642,263 | Thorp | June 16, 1953 |
| 2,664,240 | Gorton | Dec. 29, 1953 |
| 2,722,849 | O'Connor | Nov. 8, 1955 |
| 2,809,802 | Suits | Oct. 15, 1957 |

FOREIGN PATENTS

| | | |
|---|---|---|
| 660,383 | Great Britain | Nov. 7, 1951 |
| 1,024,218 | France | Jan. 7, 1953 |